(12) United States Patent
Malsam

(10) Patent No.: US 9,022,305 B2
(45) Date of Patent: May 5, 2015

(54) SELF-PROPELLED MECHANIZED IRRIGATION SYSTEM WITH A TIRE PRESSURE MONITORING SYSTEM

(75) Inventor: Craig S. Malsam, Omaha, NE (US)

(73) Assignee: Valmont Industries, Inc., Omaha, NE (US)

( * ) Notice: Subject to any disclaimer, the term of this patent is extended or adjusted under 35 U.S.C. 154(b) by 551 days.

(21) Appl. No.: 13/221,291

(22) Filed: Aug. 30, 2011

(65) Prior Publication Data
US 2012/0048965 A1    Mar. 1, 2012

Related U.S. Application Data

(60) Provisional application No. 61/378,152, filed on Aug. 30, 2010.

(51) Int. Cl.
| | | |
|---|---|---|
| *B05B 3/00* | (2006.01) | |
| *B05B 3/18* | (2006.01) | |
| *B60C 23/00* | (2006.01) | |
| *B60C 23/04* | (2006.01) | |

(52) U.S. Cl.
CPC ............ *B60C 23/008* (2013.01); *B60C 23/0408* (2013.01)

(58) Field of Classification Search
CPC .. B60C 23/0494; B60C 23/005; B60C 23/02; B60C 23/04; B60C 23/0496; G01M 17/02; G01M 17/022; A01G 25/09; A01G 25/092
USPC ............ 239/722–754, 71; 700/284; 340/446, 340/447; 73/146–146.8
See application file for complete search history.

(56) References Cited

U.S. PATENT DOCUMENTS

| | | | | |
|---|---|---|---|---|
| 4,468,650 | A * | 8/1984 | Barbee | 346/58 |
| 6,337,971 | B1 * | 1/2002 | Abts | 340/7.2 |
| 7,003,357 | B1 * | 2/2006 | Kreikemeier et al. | 700/17 |
| 7,584,053 | B2 * | 9/2009 | Abts | 701/485 |
| 2002/0119008 | A1 * | 8/2002 | Starr | 405/36 |

* cited by examiner

*Primary Examiner* — Dinh Q Nguyen
(74) *Attorney, Agent, or Firm* — Milligan PC LLO

(57) ABSTRACT

The present disclosure is directed to a mechanized irrigation system that includes an electronic controller equipped with a telemetry means configured to read wireless tire pressure monitors and transmit this information up to 2900 feet from the tires being monitored. Based on the ability to remotely monitor the tire pressure of a mechanized irrigation system, the operator can remotely determine when tire pressures are low and take the necessary corrective action to avoid costly down-time.

3 Claims, 2 Drawing Sheets

SELF-PROPELLED MECHANIZED IRRIGATION SYSTEM WITH A TIRE PRESSURE MONITORING SYSTEM

CROSS-REFERENCE TO RELATED APPLICATIONS

The present application claims the benefit of 35 U.S.C. §119(e) of U.S. Provisional Application Ser. No. 61/378,152, filed Aug. 30, 2010, and titled "SELF-PROPELLED MECHANIZED IRRIGATION SYSTEM WITH A TIRE PRESSURE MONITORING SYSTEM," which is herein incorporated by reference in its entirety.

BACKGROUND

The present disclosure is in the technical field of self-propelled mechanized irrigation systems. More particularly, the present disclosure is in the technical field of remote tire pressure monitoring.

Self-propelled mechanized irrigation systems have become an essential component in present day commercial agriculture since their introduction over sixty years ago. The self-propelled mechanized irrigation system may be any type of irrigation system known in the art, with the two prevalent irrigation systems being center pivot and linear move. One notable improvement in the art was the introduction and development of electronic controls that are designed to allow the monitoring and controlling of mechanized irrigation equipment as well as providing vast amounts of diagnostic information to an operator. The availability of this diagnostic information has drastically reduced the time and labor required to diagnose and repair mechanized irrigation equipment and reduced down-time of the mechanized irrigation equipment. However, even with these advancements, the operator cannot monitor tire pressure and impending flat tires. Tire pressure monitoring systems known in the art are not sufficient because the wireless tire pressure transmitters are design to transmit tire pressure information at distances equal to the length of the vehicles they are installed on. Self-propelled mechanized irrigation Systems may span up to 2800 feet long, which is well beyond the range of the tire pressure monitoring systems known in the art.

There are many benefits that may be obtained by overcoming this shortcoming in the prior art, which includes eliminating costly down-time associated with the replacing and repairing of flat tires on a mechanized irrigation system. Limiting or eliminating this down-time will result in increased yields, increased disease and pest control, and lower operating costs. Therefore, a need exists in the art for an irrigation system that is configured to provide the operator the ability to remotely monitor the tire pressure associated with a mechanized irrigation system.

SUMMARY

The present disclosure is directed to a mechanized irrigation system that includes an electronic controller equipped with a telemetry means configured to read wireless tire pressure monitors and transmit this information up to 2900 feet from the tires being monitored. Based on the ability to remotely monitor the tire pressure of a mechanized irrigation system, the operator can remotely determine when tire pressures are low and take the necessary corrective action to avoid costly down-time.

This Summary is provided solely to introduce subject matter that is fully described in the Detailed Description and Drawings. Accordingly, the Summary should not be considered to describe essential features nor be used to determine scope of the claims.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

The numerous advantages of the present disclosure may be better understood by those skilled in the art by reference to the accompanying figures in which.

DETAILED DESCRIPTION

It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Further, as used herein the term "plurality" refers to at least two elements. Additionally, like numbers refer to like elements throughout.

Figure 1:
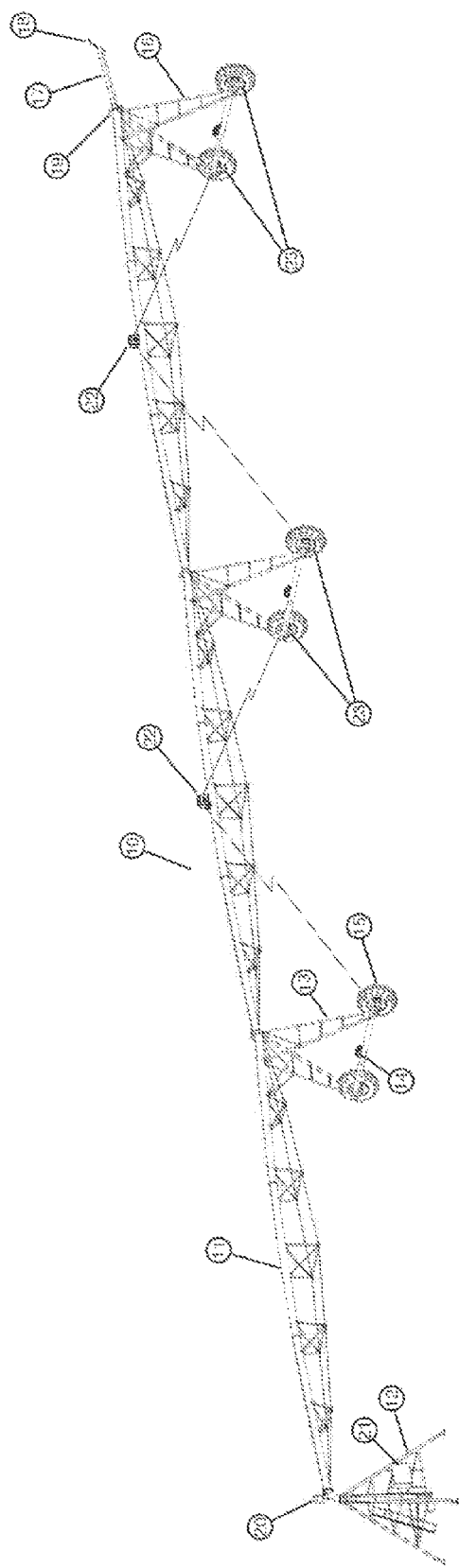
FIG. 1 is a perspective view of a center pivot irrigation system.

Referring now to the disclosure in more detail, in FIG. 1, there are two prevalent self-propelled irrigation system 10 types, being center pivot and linear move. FIG. 1 illustrates an embodiment of the present disclosure where the irrigation system 10 is a center pivot irrigation system.

Irrigation system 10 includes a water conduit 11 that extends outwardly from a conventional center pivot structure 12. Water conduit 11 may comprise a pipe or a boom. Water conduit 11 is comprised of a plurality of pipe sections joined together in an end-to-end relationship, which are supported upon a plurality of drive units 13. A common range of span length of each pipe section is about 50 feet to about 225 feet. The water pipe section of water conduit 11 may be constructed from any structural shape known in the art. Water conduit 11 is generally a thin-walled pipe having any diameter wherein the more common diameters in the art include: five inches (5"), six inches (6"), six and five-eights inches (6⅝"), eight and five-eights inches (8⅝"), and ten inches (10"). The water pipe sections and its components as identified above may be made of any material known in the art including, aluminum, polyethylene, PVC, other plastic compositions, galvanized steel, stainless steel, or any combination thereof.

Throughout irrigation system 10, components may be coupled using any coupling method known in the art, including, but not limited to: bolts, screws, rivets, welds, clamps, threaded connections, pins, sleeves, or any other connection method known in the art and any combination thereof.

Each drive unit 13 has a drive means 14 for propelling, or driving, the wheel 15 thereof. Drive means 14 is generally an electric motor having a horsepower output ranging from 0.5 to 1.2 hp. Embodiments of the present disclosure may include variable speed motors. It is contemplated that other drive motors may be used. Drive means 14 is in electronic communication with control panel 21 wherein control panel 21 controls the speed of drive means 14 through any number of electronic communication and control systems known in the art. In most cases, the drive means 14 will comprise an electric motor that may be reversible so that the irrigation system 10 may be driven in either a forward direction or a reverse direction.

The drive unit 13 may support a water conduit 11. FIG. 1 illustrates an embodiment of the drive unit 13 as having a general "V" shape. The drive unit 13 is directly coupled to a water conduit 11. Each drive unit 13 also includes a drive means 14 that propels at least one wheel 15. The drive means 14 is coupled to the at least one wheel 15. The drive means 14 may be coupled to the at least one wheel 15 via a gearbox (not shown).

Normally, the machine alignment on the irrigation system 10 is maintained by a mechanical linkage at each drive unit 13 span joint, which operates a micro-switch that in turn starts and stops the drive means 14 on the drive unit 13 to keep in line with the next span. The last drive unit on the irrigation system 10 is designated by reference numeral 16. Normally, a cantilevered boom 17, know as an overhang assembly, extends outwardly from the last drive unit 16 and has an end gun 18 mounted thereon. The end gun 18 may be actuated to irrigate areas outside the area covered by the water conduit 11 between the center pivot structure 12 and the last drive unit 16.

A speed control 19 is typically mounted on the last drive unit 16. The speed control 19 may comprise a percent timer, a variable speed drive, or other speed control device that is coupled to the drive means 14 on the last drive unit 16.

A position sensor is also coupled to irrigation system 10. Typically, this is either an angle sensor 20 mounted at the center pivot structure 12, or a GPS receiver proximately coupled to the last drive unit 16. Position sensor is in electronic communication with the control panel 21 and sends a signal to control panel 21 that communicates the position of the irrigation system 10. For example, the angle sensor 20 transmits a signal communicating the rotational position of the water conduit 11 to the control panel 21. In another example, the GPS receiver transmits a signal communicating the GPS coordinates of the last drive unit 16 to the control panel 21.

FIG. 1 illustrates a computer control panel 21 mounted on the center pivot structure. The computer control panel 21 is configured to control many machine functions including, but not limited to: speed, direction, water on or off, start or stop, end guns on or off, etc. The control panel 21 is in electronic communication with the position sensor (e.g., angle sensor 20) and speed control 19, which in turn is coupled to drive means 14 that is coupled to the last drive unit 16. Computer control panel 21 is also configured to monitor and display system information and diagnostics.

Generally, control panel 21 is housed in a weather-proof box and includes at least an internal memory, a micro-processor, and a user-interface. The user-interface allows a user to input data and/or desired parameters, observe and obtain operating data, and receive output of irrigation system's 10 operational status. Control panel 21 is generally operated using proprietary software and may be connected to a network that allows a user to remotely input operational parameters, remotely view the operational status of irrigation system 10, and receive remote alerts if irrigation system 10 is not operating correctly. Control panel 21 is generally in electronic communication with the various sensors, switches, motors, valves, pumps, and monitors that control the operation of irrigation system 10 and allow control panel 21 to monitor the operating conditions of irrigation system 10. Electronic communication may be achieved through a wired or a wireless connection, or any other electronic communication method known in the art. A person of skill in the art will recognize that many embodiments of control panel 21 are known in the art and all such embodiments of control panel 21 are within the scope of the present disclosure.

Remote tire pressure monitoring system 22 is configured to remotely monitor tire pressure from one or more wireless tire pressure sensor(s) 23 through electronic communication. Remote tire pressure monitoring system 22 may be coupled or mounted anywhere on the irrigation system 10 where the remote tire pressure monitoring system 22 can remotely monitor tire pressure readings taken by wireless tire pressure sensors 23. As illustrated in FIG. 1, a first remote tire pressure monitoring system 22 is positioned on a first water conduit 11 between a first drive unit 13 and a second drive unit 13. Furthermore, a second remote tire pressure monitoring system 22 is positioned on a second water conduit 11 between the second drive unit 13 and the last drive unit 16. It is contemplated that one skilled in the art may position the remote tire pressure monitoring systems 22 in other various positions along the irrigation system 10 without departing from the spirit of the disclosure. Remote tire pressure sensor 23 may comprise PressurePro APS1-1.3.1 or the like.

Figure 2:
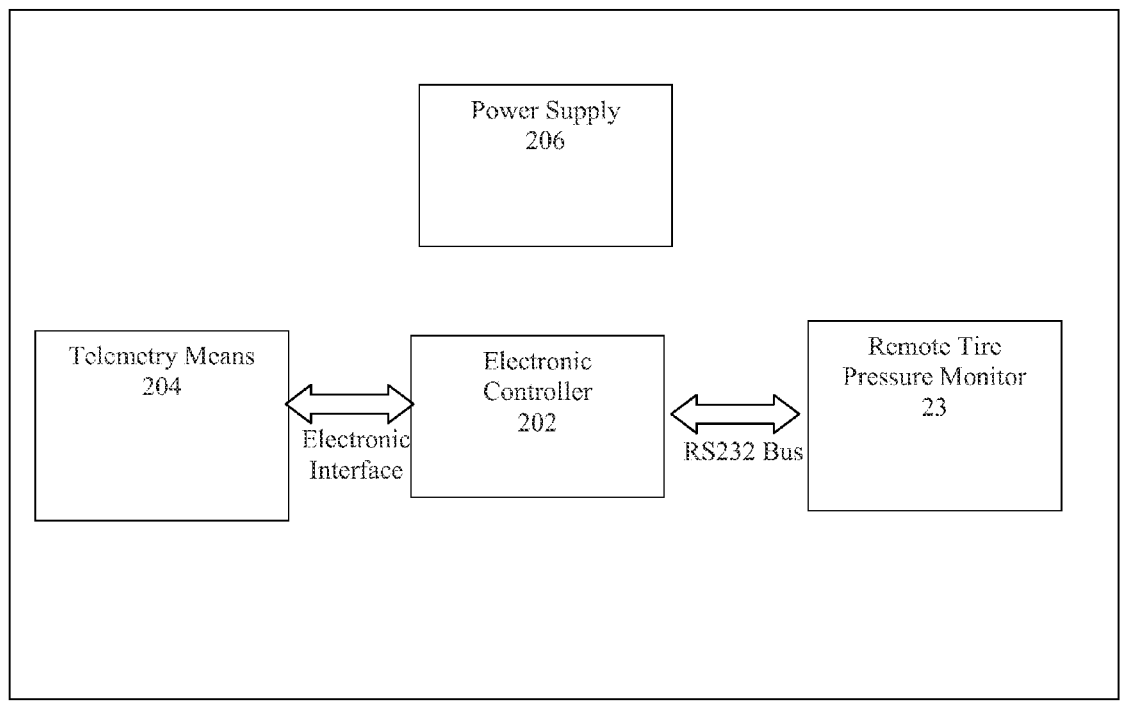
FIG. 2 is a block diagram of the remote tire pressure monitor system.

FIG. 2 illustrates a block diagram depicting the remote tire pressure monitoring system 22. In one implementation, an electronic controller 202 of a remote tire pressure monitor 22 is coupled to a telemetry means 204 via an electronic interface. The electronic controller 202 and the telemetry means 204 may be contained within a waterproof housing and coupled to a power supply 206. Furthermore, the electronic controller 202 may comprise a micro-controller, a memory coupled to the micro-controller, and so forth. The electronic controller 202 is configured to receive tire pressure information or data from one or more remote tire pressure sensors 23. In a specific implementation, the electronic controller 202 may comprise PressurePRO APM1 or the like. The telemetry means 204 may comprise a Power Line Carrier modem or the like that is configured to transfer tire pressure information or data up to 2900 feet.

Multiple remote tire pressure monitoring systems 22 may be mounted or coupled on the irrigation system 10 to ensure the remote tire pressure monitoring systems 22 are within range of the remote tire pressure sensors 23 mounted on the tires 15. A compatible telemetry means 204 (e.g., Power Line Carrier modem) would be placed in the computer control panel 21. The telemetry means 204 may further be interfaced the computer control panel 21 via electronic communication. The computer control panel 21 may include a software application executable by the computer control panel's 21 processor. The software application is configured to request tire pressure information from the multiple remote tire pressure monitoring systems 22 (e.g., electronic controllers) at predefined time intervals via electronic communication. Once received, the software application presents the requested tire pressure information to a display disposed in the computer control panel 21 for the operator. With this information the operator can remotely determine when tire pressures are low and take the necessary corrective action to avoid costly downtime. The electronic interface may comprise a wired configuration, a wireless configuration, or the like. In some embodiments, the system may display an alert when an out-of-specification tire pressure it detected. Such out-of-specification conditions could be over pressure in a tire or a low pressure in a tire.

In another implementation, the electronic controller 202 is coupled to a telemetry means 204, where the telemetry means 204 may comprise: a GSM Cellular Modem, a Satellite Modem, a CDMA Modem, a VHF/UHF Modem, or other wireless telemetry modem. In this implementation, the remote tire pressure monitoring systems 22 is configured to transmit the tire pressure information to a remote computer. This implementation would be desirable to allow retrofitting of the present disclosure to existing mechanized irrigation systems where access to a computer control panel 21 may be limited.

The advantages of the present disclosure include, without limitation, the ability for an operator to remotely monitor tire pressure, limiting or eliminating down-time associated with replacing or repairing flat tires, resulting in increased yields, increased disease and pest control, and lower operating costs.

While the foregoing written description of the disclosure enables one of ordinary skill to make and use what is considered presently to be the best mode thereof, those of ordinary skill will understand and appreciate the existence of variations, combinations, and equivalents of the specific embodiment, method, and examples herein. The disclosure should therefore not be limited by the above described embodiment, method, and examples, but by all embodiments and methods within the scope and spirit of the disclosure.

I claim:

1. An irrigation system, wherein the irrigation system comprises:
    a central pivot structure;
    a water conduit element;
    a central control element;
    a first pipe section, wherein the first pipe section is configured to support a first section of the water conduit element;
    a first drive unit, wherein the first drive unit is secured to the first pipe section, further wherein the first drive unit is comprised of a motor and a plurality of tires, further wherein the first drive unit is further comprised of a remote tire pressure sensor configured to detect the air pressure of at least one of the plurality of tires in the first drive unit, further wherein the first drive unit is further comprised of a transmitting element for transmitting tire pressure data regarding one or more tires of the first drive unit;
    a second pipe section, wherein the second pipe section is configured to support a second section of the water conduit element;
    a second drive unit, wherein the second drive unit is secured to the second pipe section, further wherein the second drive unit is comprised of a motor and a plurality of tires, further wherein the second drive unit is further comprised of a remote tire pressure sensor configured to detect the air pressure of at least one of the plurality of tires in the second drive unit, further wherein the second drive unit is further comprised of a transmitting element for transmitting tire pressure data regarding one or more tires of the second drive unit;
    a third pipe section, wherein the third pipe section is configured to support a third section of the water conduit element;
    a third drive unit, wherein the third drive unit is secured to the third pipe section, further wherein the third drive unit is comprised of a motor and a plurality of tires, further wherein the third drive unit is further comprised of a remote tire pressure sensor configured to detect the air pressure of at least one of the plurality of tires in the third drive unit, further wherein the third drive unit is further comprised of a transmitting element for transmitting tire pressure data regarding one or more tires of the third drive unit;
    a first tire pressure monitoring system, wherein the first tire pressure monitoring system is positioned between the first drive unit and the second drive unit, further wherein the first tire pressure monitoring system is configured to receive and consolidate data from the first and second drive units, further wherein the first tire pressure monitoring system is further configured to transmit received data to the central control element, further wherein the first tire pressure monitoring system is configured to receive requests for tire pressure data from the central control element; and further wherein the first tire pressure monitoring system is further configured to request data from the first drive unit and the second drive unit regarding tire pressure data; and
    a second tire pressure monitoring system, wherein the second tire pressure monitoring system is positioned between the second drive unit and the third drive unit, further wherein the second tire pressure monitoring system is configured to receive and consolidate data from the second and third drive units, further wherein the second tire pressure monitoring system is further configured to transmit received data to the central control element, further wherein the second tire pressure monitoring system is configured to receive requests for tire pressure data from the central control element; and further wherein the second tire pressure monitoring system is further configured to request data from the second drive unit and the third drive unit regarding tire pressure data.

2. The irrigation system of claim 1, wherein the central control element is configured to receive tire pressure data and send a signal indicating an out-of-specification tire pressure should such a condition exist.

3. The irrigation system of claim 2, wherein the signal is sent to a location remote of the irrigation system.

* * * * *